United States Patent [19]
Toda

[11] Patent Number: 5,659,594
[45] Date of Patent: Aug. 19, 1997

[54] MOBILE TELEPHONE SYSTEM CAPABLE OF ADAPTING A PORTABLE TELEPHONE SET

[75] Inventor: Yoshifumi Toda, Tokyo, Japan

[73] Assignee: Fujitsu Limited, Kawasaki, Japan

[21] Appl. No.: 390,280

[22] Filed: Feb. 15, 1995

Related U.S. Application Data

[63] Continuation of Ser. No. 216,369, Mar. 23, 1994, abandoned, which is a continuation of Ser. No. 951,948, Sep. 28, 1992, abandoned, which is a continuation of Ser. No. 587,420, Sep. 25, 1990, abandoned.

[30] Foreign Application Priority Data

Sep. 25, 1989 [JP] Japan ................. 01-248648

[51] Int. Cl.$^6$ ............................... H04Q 7/32
[52] U.S. Cl. ............ 455/552; 455/426; 455/575
[58] Field of Search ................. 379/58, 59, 61, 379/63; 455/11, 33.1, 38.3, 54.1, 88, 89, 90, 127, 343

[56] References Cited

U.S. PATENT DOCUMENTS

| 4,539,706 | 9/1985 | Mears et al. | 455/11.1 |
| 4,903,325 | 2/1990 | Yoshitake et al. | 455/89 |
| 4,905,304 | 2/1990 | Bordon et al. | 455/89 |
| 5,029,233 | 7/1991 | Metroka | 455/54 |
| 5,033,109 | 7/1991 | Kawano et al. | 455/90 |
| 5,036,532 | 7/1991 | Metroka et al. | 455/89 |
| 5,054,115 | 10/1991 | Sawa et al. | 455/89 |
| 5,095,541 | 3/1992 | Aisaka et al. | 455/89 |
| 5,193,219 | 3/1993 | Tamura | 455/89 |
| 5,203,020 | 4/1993 | Sato | 455/89 |

FOREIGN PATENT DOCUMENTS

| 0204640 | 11/1983 | Japan | 379/61 |

Primary Examiner—Dwayne D. Bost
Attorney, Agent, or Firm—Staas & Halsey

[57] ABSTRACT

A mobile telephone system includes: a portable telephone set, an adaptor on a vehicle for the portable telephone set to rest thereon, a remote controller unit for dialing and voice talking, and a transceiver unit for modulating/demodulating voice signal and control signals, and transmitting/receiving radio frequency signals. The portable telephone set has apparatus for electrically connecting to the adaptor when the portable telephone set is rested thereon, and a first control circuit for transferring identification numbers of the portable telephone set to the transceiver unit and then disabling a predetermined part of functions of the portable telephone set except charging a battery of the portable telephone set from the adaptor. The transceiver unit has a second control circuit for storing the identification numbers transferred from the portable telephone set, and allowing the transceiver unit and the control unit to operate as a vehicle telephone system using the identification number of the portable telephone set. The adaptor electrically connects between the portable telephone set, the remote control unit and the transceiver unit. The second control circuit may store second identification numbers so that the transceiver unit and the control unit may operate as an independent vehicle telephone system or as a multiple telephone number system.

8 Claims, 19 Drawing Sheets

| MANUFACTURER'S CODE NO. | APPARATUS SERIAL NUMBER |
|---|---|

| MOBILE IDENTIFICATION NUMBER (MIN) |
|---|

| SYSTEM IDENTIFICATION OF HOME MOBILE SERVICE (SIDH) |
|---|
| ID NO. FOR TRANSMITTING POWER LEVEL (SCM) |
| CONTROL CHANNEL INFORMATION (IPCH) |
| ACCESS PRIORTY (ACCOLC) |
| LOCK CODE |
| PHONE NUMBERS (1 – N) |
| EAR PHONE VOLUME LEVEL |
| ALERT VOLUME LEVEL |

FIG. 11

MOBILE TELEPHONE SYSTEM CAPABLE OF ADAPTING A PORTABLE TELEPHONE SET

This application is a continuation of application Ser. No. 08/216,369, filed Mar. 23, 1994, now abandoned, which is a continuation of application Ser. No. 07/951,948, filed Sep. 28, 1992, abandoned, and which is a continuation of application Ser. No. 07/587,420, filed Sep. 25, 1990, abandoned.

BACKGROUND OF THE INVENTION

1. Field of the Invention

The present invention relates to a vehicular adaptor system which can adapt a portable telephone set to a vehicle having no vehicular telephone or to a vehicular telephone installed in a vehicle, used in a multiple carrier access system, such as a cellular mobile telephone system.

2. Description of the Related Art

Recently, portable telephones have become smaller in size and lighter in weight, i.e. convenient to carry. Accordingly, due to increased popularity, their numbers are increasing. A portable telephone can be considered a compact and light weight modification of the vehicular telephone due to its lower output power than the vehicular telephone. Since it is easily portable, it is used almost in the same way in the service area of the vehicular telephone. The portable telephone can be used in a vehicle; however, if it is used as it is, the shielding effect of the metal body of the vehicle decreases the radio frequency wave propagation, i.e. output power and receiving sensitivity, of the portable telephone, and may result in its operation being disabled. Therefore, a radio frequency booster/pre-amplifier is installed in the vehicle and a vehicular antenna is installed outside the vehicle.

A prior art vehicular adaptor system for a portable telephone set is hereinafter described with reference to a perspective view in FIG. 1. A portable telephone set 11 is composed of a main body of the portable telephone set and an antenna (not seen there due to being integrated in the main body). The main body includes an earphone, a speaker, a key board, and a display for displaying a call number dialed onto the key board, etc. When the portable telephone set 11 is rested in a cradle 12' of a vehicular adaptor 12, an end $A_4$ of cradle 12' and an end $A_2$ of portable telephone set 11 are electrically contacted so as to communicate control signals, audio signals and an adaptor signal informing the fact that the portable telephone set 11 is mounted on the adaptor, between the adaptor 12 and the portable telephone set 11. The antenna integrated in the main body of the portable telephone set 11 is coupled with a radio frequency coupler (not seen in the figure) integrated in a side $A_3$ of cradle 12' so as to face the integrated antenna. Adaptor 12 communicates control signals of booster 13 and radio frequency signals to/from booster/pre-amplifier 13 by means of a control signal cable and a radio frequency cable. Adaptor 12 further communicates up-link/down-link data and audio signals to/from a remote control unit (referred to hereinafter as control unit) 14 by means of another cable.

Functions of the above-described adaptor system for the portable telephone are summarized as follows:

1. The portable telephone set brought into the vehicle is rested on vehicular adaptor 12. Then, a battery installed in the portable telephone set is charged by a charging circuit of the adaptor.

2. 0.6 watt output power of the portable telephone set is fed via vehicular adaptor 12 to radio frequency booster 13, wherein 0.6 watt is amplified up to 3 watt.

3. A radio frequency signal to be input to portable telephone set 11 is amplified so as to compensate for coupling losses at the radio frequency coupler, etc., and accordingly becomes the level as strong as a level of the portable telephone set when used outside the vehicle.

4. Control unit 14 is used in the same way as a vehicular telephone set, i.e. is used as a hand set for talking, for dialing a call number via its key board and for displaying the phone number, etc. thereon.

To use portable telephone 11 in a vehicle in which a vehicle telephone has been already installed, all of FIG. 1 adaptor system is independently required in addition, except for a commonly used vehicular antenna.

The problems of the prior art FIG. 1 adaptor system include the following:

(1) Having to control both of the control unit and the radio frequency power booster/pre-amplifier, the adaptor unit becomes complicated in configuration and large in size.

(2) For connecting the integrated antenna of the portable telephone set to the radio frequency booster/pre-amplifier, a radio frequency coupler is required in the adaptor, causing complicated structure and precise mechanism.

(3) The vehicular adaptor becomes large in size caused the system to become large and occupy a large space in the vehicle.

(4) A portable telephone set to be used in a vehicle already having a vehicle telephone installed thereon requires a considerable investment for the duplicated radio frequency circuits, as well as a large space therefor.

SUMMARY OF THE INVENTION

It is therefore an object of the present invention to provide a less expensive and less spacious vehicular adaptor system capable of adapting a portable telephone to a vehicle.

It is another object of the present invention to provide a vehicular telephone system which can place/answer a call by either identification number of the vehicular telephone or of a portable telephone adapted to the vehicular telephone system.

A mobile telephone system according to the present invention comprises: a portable telephone set; an adaptor for the portable telephone set to rest thereon; a remote control unit for dialing and voice talking; and a transceiver unit for modulating/demodulating voice signal and control signals, and transceiving radio frequency signals. The portable telephone set further comprises means for electrically connecting to the adaptor on a vehicle when the portable telephone set is rested thereon, and a first control circuit for transferring identification numbers of the portable telephone set to the transceiver unit and the disabling a predetermined part of functions of the portable telephone set except charging a battery of the portable telephone set from the adaptor. The transceiver unit comprises a second control circuit for storing the identification numbers transferred from the portable telephone set, and the transceiver unit and the remote control unit are allowed to operate as a vehicle telephone system using the identification numbers of the portable telephone set. The adaptor further connects electrically between the portable telephone set, the control unit and the transceiver unit. The second control circuit in the transceiver unit may additionally store a second identification number so that the transceiver unit and the control unit may operate as an independent vehicle telephone system even when the portable telephone set is not adapted to the adaptor. A system according to a second invention comprises the same transceiver unit as described above; a second adaptor which is connected with the portable telephone set via cables and outputs an adaptor signal when the portable telephone set is connected thereto. On receiving the adaptor signal, the portable telephone set transfers the identification numbers to the transceiver unit and then disables a predetermined part of the portable telephone set functions while charging the battery on the portable telephone set from the adaptor. The portable telephone set is picked up from the adaptor, so as to be handled in the same way as the remote control unit of the first invention, i.e. to dial via the keyboard as well as to talk via the microphone and earphone of the portable telephone set. Then, the transceiver unit operates in the same way as the first invention. The less expensive transceiver unit produced in a mass quantity for a vehicular telephone system allows a less expensive system configuration for the portable telephone set to be used in a vehicle.

The above-mentioned features and advantages of the present invention, together with other objects and advantages, which will become apparent, will be more fully described hereinafter, with reference being made to the accompanying drawings which form a part thereof, wherein like numerals refer to like parts throughout.

BRIEF DESCRIPTION OF THE DRAWINGS

FIG. 11 is a chart for data stored in the portable telephone set;

DESCRIPTION OF THE PREFERRED EMBODIMENTS

Figure 2:
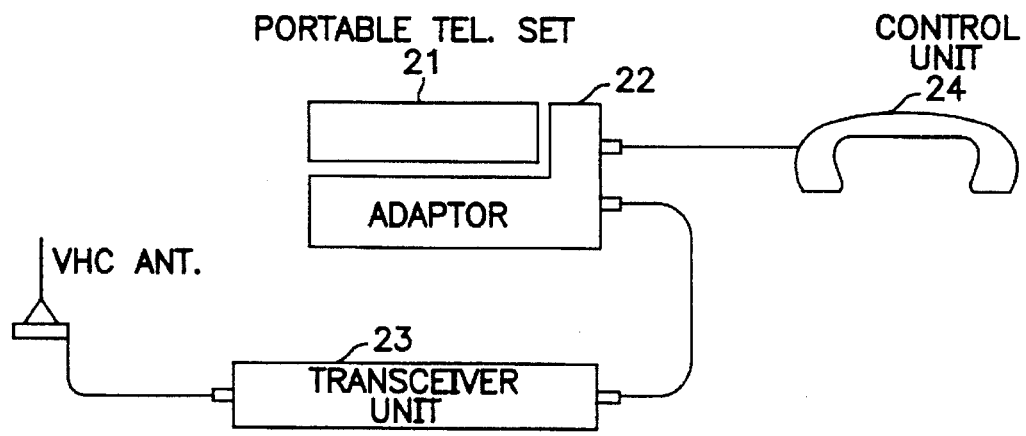
FIG. 2 is a schematic diagram of a configuration of the first preferred embodiment of the present invention.
Figure 3:
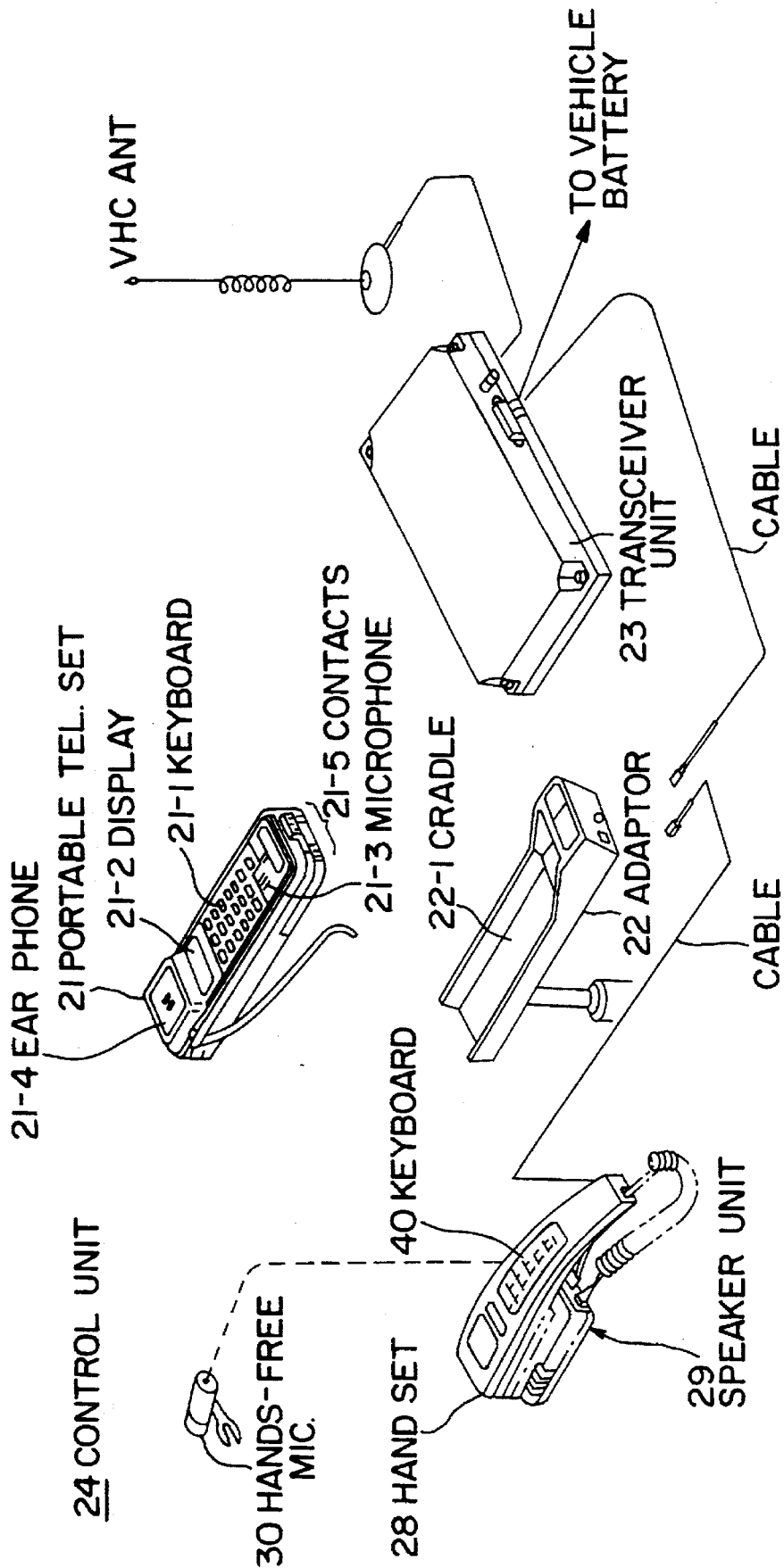
FIG. 3 is a schematic diagram of a perspective view of a first preferred embodiment of the present invention.
Figure 4:
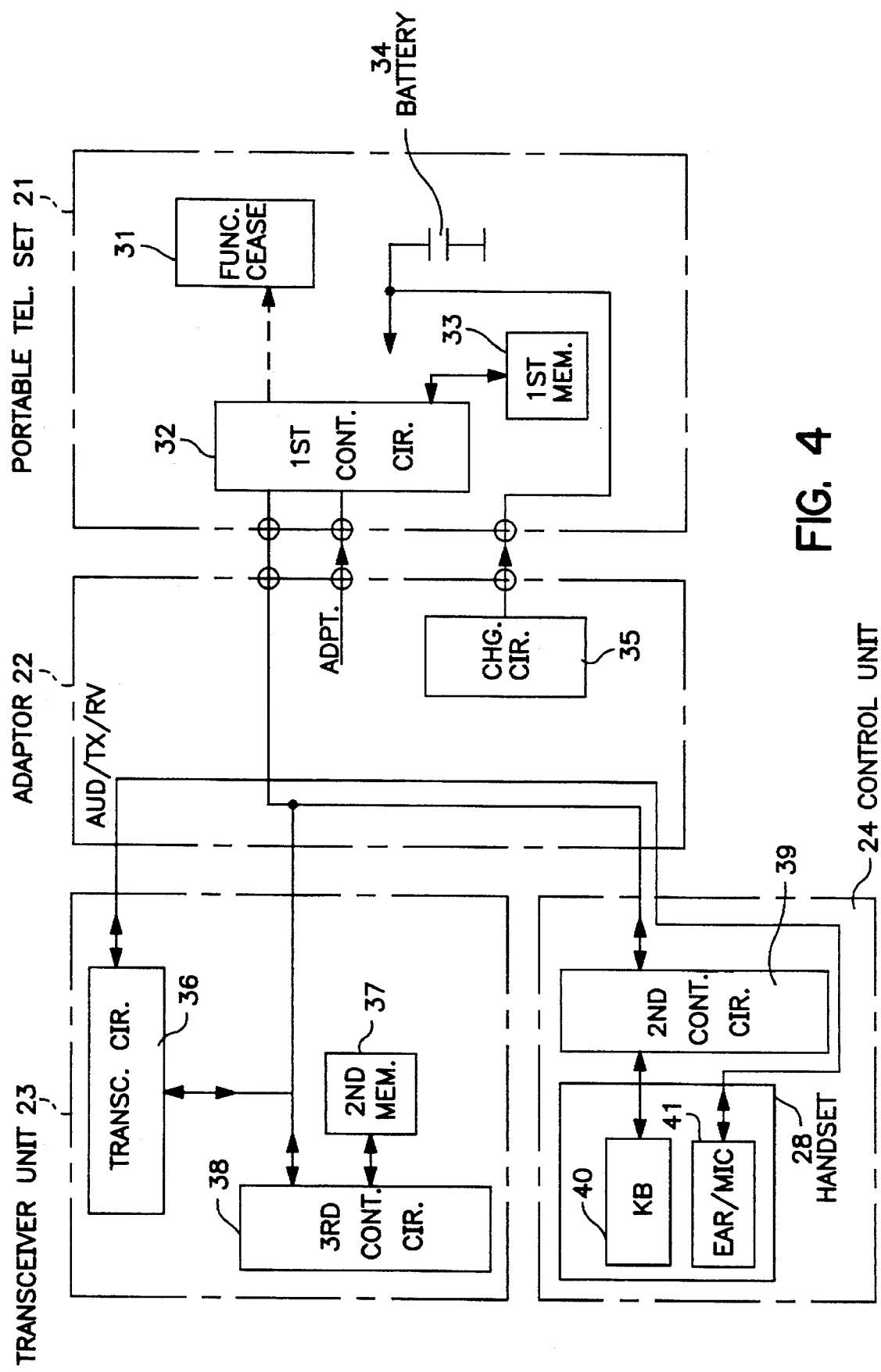
FIG. 4 is a principle block diagram of the first preferred embodiment of the present invention.

A schematic configuration of a first preferred embodiment of the present invention is shown in FIG. 2. A perspective view of FIG. 2 is shown in FIG. 3, and a principle block diagram is shown in FIG. 4. A portable telephone set 21 comprises: a function ceasing circuit 31; a first control circuit 32; a first memory 33; a battery 34; a keyboard 21-1; a display 21-2 and a plurality of contacts 21-5 for electrically connecting to an adaptor 22 described below. Adaptor 22 is installed in a vehicle and has a cradle 22-1 to detachable hold portable telephone set 21 thereon. Adaptor 22 comprises: at an inner sidewall of cradle 22-1 a plurality of contacts 310 (not shown in FIG. 3 but in FIG. 8) for contacting the contacts 21-5 when portable telephone set 21 is held thereon; internal wirings for interconnecting the signals to/from a transceiver unit 23 and the signals to/from a control unit 24; and a charging circuit 35 for charging battery 34. On holding portable telephone set 21 on adaptor 22, the adaptor 22 transmits an adaptor signal ADPT to portable telephone set 21. Transceiver unit 23 is installed in the vehicle and comprises a transceiver circuit 36 which transmits a radio frequency signal of a predetermined frequency and power carrying a transmitting audio AUD/TX and the identification numbers, etc., i.e. transmitting data DAT/TX, as well as outputs from a received-signal input from a vehicle antenna VHC ANT a received-audio signal AUD/RV and a received-control data DAT/RV; a second memory 37 which stores the identification numbers, etc. as control signals, transferred from portable telephone set 21; and a third control circuit 38. Remote control unit (referred to hereinafter as control unit) 24 is installed in the vehicle and comprises a microphone and an earphone (both denoted with the number 41); a handset 28 carrying a keyboard 40; and a second control circuit 39 for processing the signals input/output to/from the handset 28.

The operation of the above system is hereinafter described. When portable telephone set 21 is installed on adaptor 22, and accordingly, adaptor signal ADPT is received from adaptor 22, first control circuit 32 transfers the data, such as identification numbers, stored in first memory 33 via adaptor 22 to second memory 37, and battery 34 is charged from charging circuit 35 of adaptor 22. After waiting a predetermined period, such as 10 second after receiving the adaptor signal ADPT, function-ceasing circuit 31 disables a supply of power source voltage to, for example, a transceiver circuit (not shown in FIG. 4, but described later) in portable telephone set 21, while the battery charging is kept on. Operations necessary for a mobile telephone, such as placing/answering a call, are accomplished by the use of the identification numbers stored in second memory 37, of transceiver unit 23, while satisfying the required transmitting power and receiving sensitivity.

Figure 5:
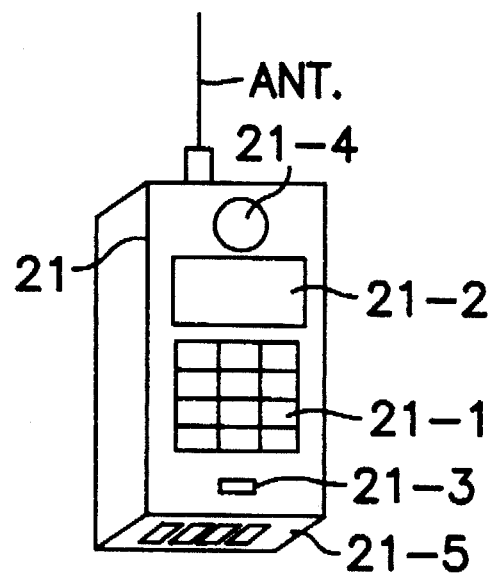
FIG. 5 is a schematic diagram of an external view of the portable telephone set.
Figure 6:
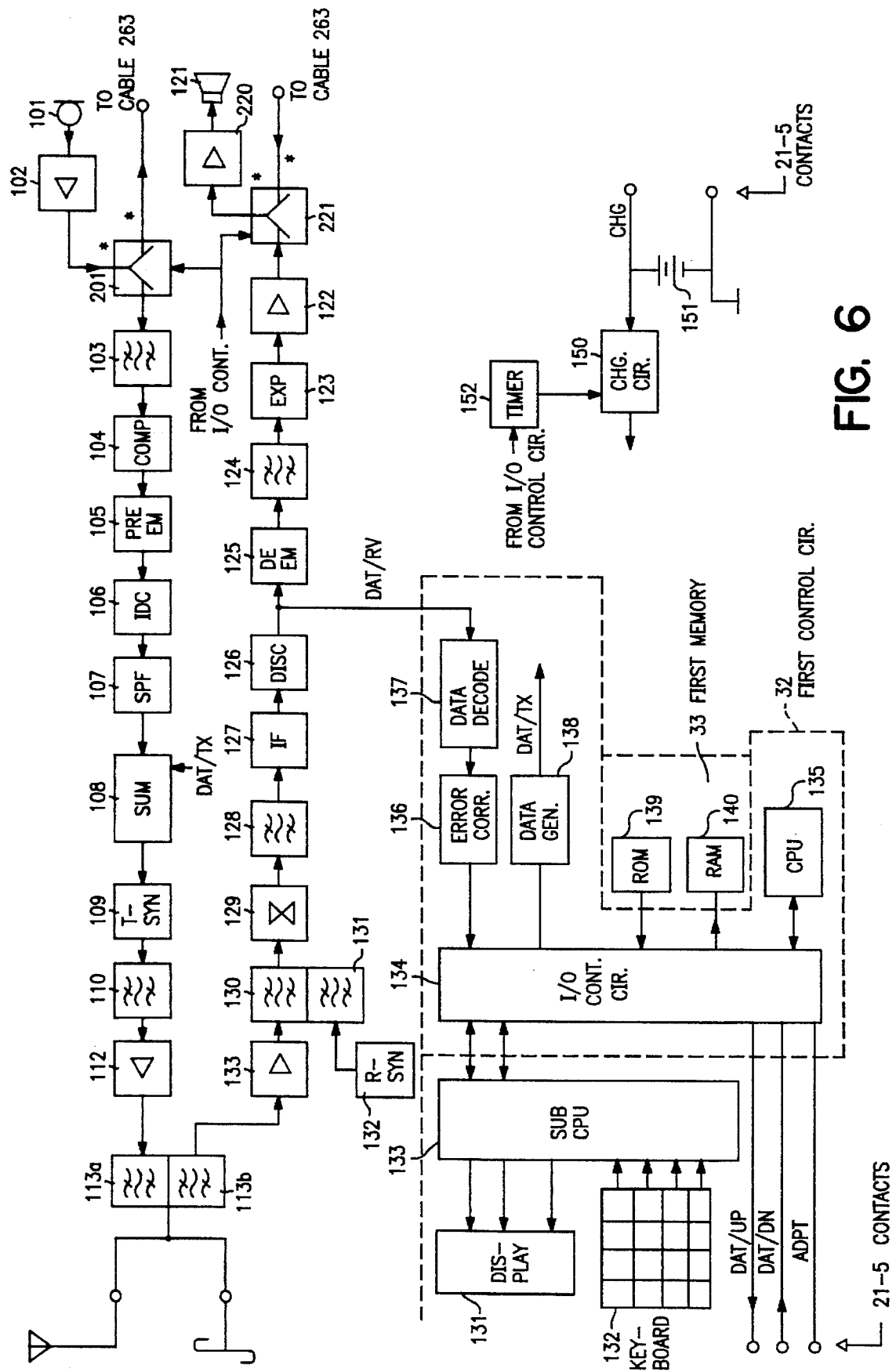
FIG. 6 is a circuit block diagram of the portable telephone set.
Figure 8:
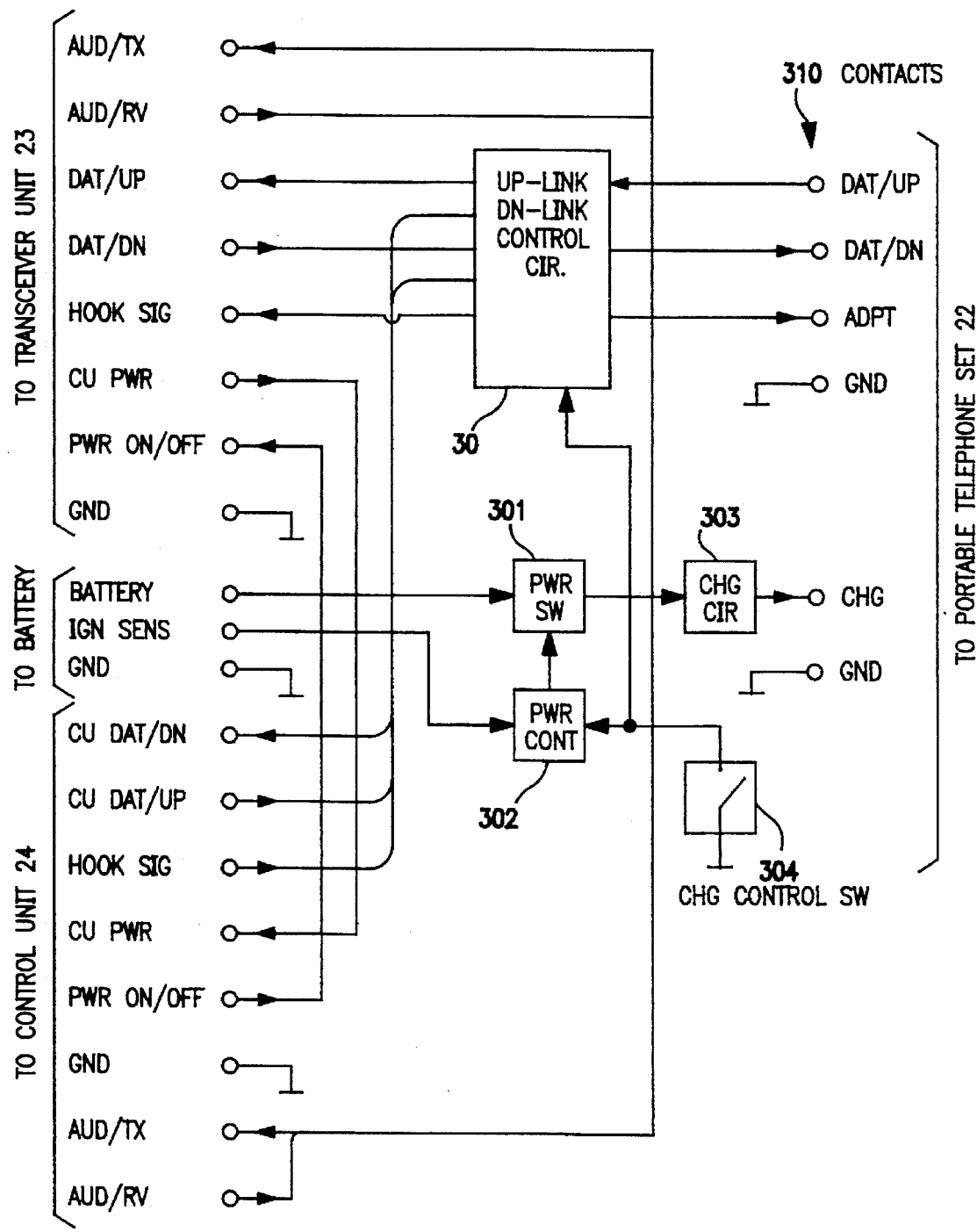
FIG. 8 is a circuit block diagram of an adaptor.
Figure 9:
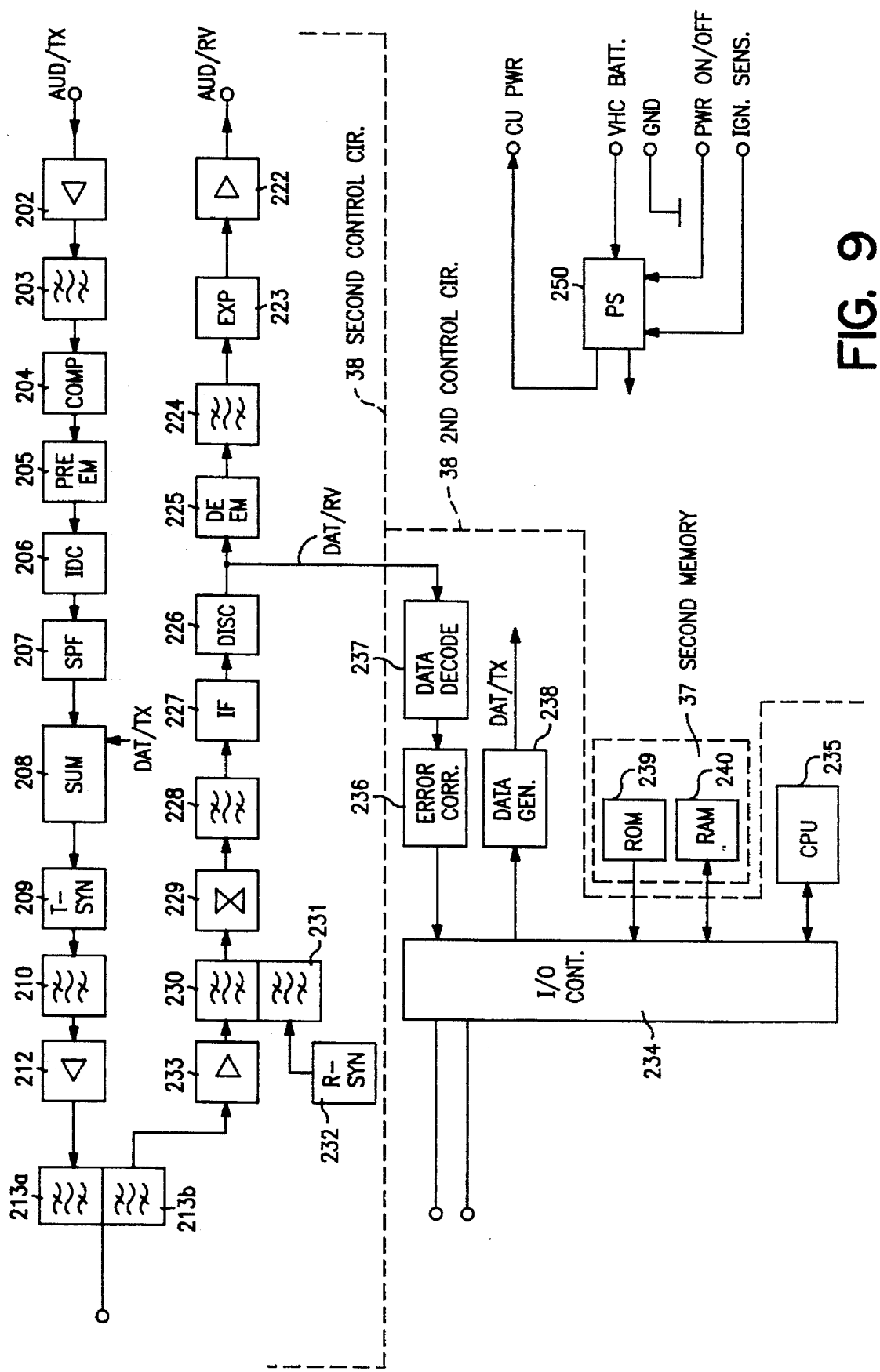
FIG. 9 is a circuit block diagram of a transceiver unit.
Figure 10:
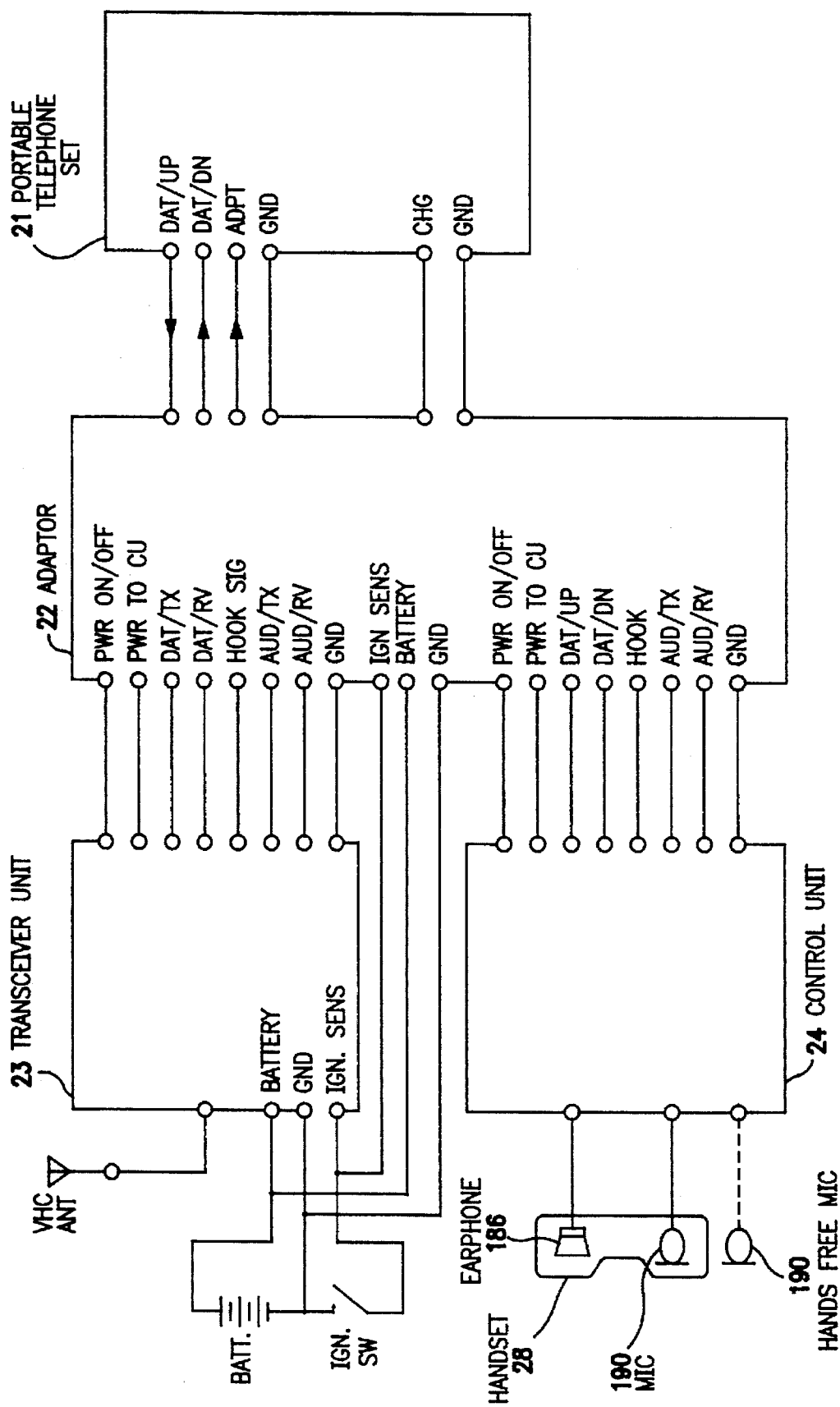
FIG. 10 is a diagram of the interconnection of FIG. 4 in accordance with the first preferred embodiment.

Further details of the first preferred embodiment are hereinafter described. An external view and circuit configuration of portable telephone set 21 are schematically illustrated in FIG. 5 and in the circuit diagram of FIG. 6, respectively. In FIG. 6, the portions denoted with * marks, i.e. switches 201 and 221 and wirings connected from these switches to external terminals, are not used for portable telephone set 21 of the first preferred embodiment, but are used for the second preferred embodiment to be described later. The circuit configuration of control circuit 39 is surrounded with dotted lines. The circuit configuration of adaptor 22 is shown in FIG. 8, which comprises power switch 301, power switch control circuit 302, charging circuit 303 (denoted with the number 35 in FIG. 4) which determines its charging current, and charge control switch 304. The circuit configuration of transceiver unit 23 is shown in FIG. 9. Mutual connections, via adaptor 22, between portable telephone set 21 installed thereon, transceiver unit 23 and control unit 24, are shown in FIG. 10.

At first, an out-of-vehicle operation of portable telephone set 21 is hereinafter described, with reference to the FIG. 6 configuration of the portable telephone set. In FIG. 6, a group of radio frequency circuits denoted with the numerals from 113a (duplexer) to 109 (transmitter synthesizer with modulator) form a transmitter circuit; a group of low frequency circuits denoted with the numerals from 108 (summing circuit) to 103 (band-pass filter) form a transmitting-audio circuit; a group of low frequency circuits denoted with the numerals from 113b (duplexer) to 126 (discriminator) form a receiver circuit; a group of low frequency circuits denoted with the numerals from 122 (amplifier) to 125 (de-emphasizer) form a received audio circuit; and a circuit denoted with the numerals from 131 (display) to 140 (RAM) form a digital control circuit. Further details of each of these circuits are hereinafter described.

(1) Transmitter circuit and transmitting-audio circuit.

An audio signal output from microphone 101, passes microphone amplifier 102 and bandpass filter 103 (referred to hereinafter as BPF) for allowing a 300 Hz to 3 KHz audio signal to pass, has its dynamic range compressed down to 2:1 by compressor 104, next has its frequency characteristics adjusted to 6 db/octave by pre-emphasis circuit 105, and next has its maximum frequency deviation limited to below a predetermined level by an instantaneous frequency deviation limiter 106 so that the maximum frequency deviation does not exceed a predetermined level even when a loud voice is talked. Next, the pass-band of the signal is narrowed in splatter filter 107 by suppressing the higher harmonics components of the signal. The signal is then added with the transmittal signal DAT/TX including the above-described identification numbers, etc. by summing circuit 108 so as to generate a modulation signal. The modulation signal directly modulates transmitter synthesizer with modulator 109 so as to generate a frequency-modulated (FM) signal. This FM signal, via bandpass filter 110, power amplifier 112 and duplexer 113a, is transmitted from antenna ANT. On being pulled up, the antenna ANT operates as an external antenna. When the antenna is pushed in, the circuit is automatically switched to connect to an integral antenna by a switch (not seen in the figure).

(2) Receiver Circuit and Received Audio Circuit

A radio frequency signal received by the antenna is input via duplexer 113b, pre-amplifier 133 and BPF 130, to mixer 129. Mixer 129 is also input with the output signal of receiver synthesizer 132 via another BPF 131, and converts the frequency of the signal input thereto so as to generate an FM intermediate frequency (referred to hereinafter as IF) signal. This FM signal, via internal frequency amplifier 127, is discriminated by frequency discriminator 126. Out of the discriminated signal a digital signal and an audio signal are separated. The digital signal is input to first control circuit 32 and the audio signal is output, via de-emphasis circuit 125, BPF 124, expander 123, and audio amplifier 122, to earphone 121. Power source circuit 150 in portable telephone set 21 generates necessary voltages.

(3) Digital Control Circuit

Identification numbers of the portable telephone set 21, such as the manufacturer's code number, the apparatus serial number and mobile identification number, which are legally required for placing/answering a call, for position registration, and for zone switching, have been written in ROM (read only memory) 139 in advance. When the power switch is closed, the data in ROM 139 is loaded to RAM 140 by a CPU (central processing unit) 135 according to a program installed in ROM 139 in advance. Furthermore, as many as several tens of phone numbers which have been input by a memory dialing function or a phone number of the last-number re-dialing function, etc. have been stored in RAM 140. Contents of the data are shown in FIG. 11, as an example, According to the data in RAM 140, CPU 135 carries out the controls of: (a) answering a call; (b) placing a call; (c) position registration; (d) zone switching during a call; and (e) ending a call. Operation of the digital control circuit of the portable telephone set 21 rested on adaptor 22 will be described alter.

(a) Control to Answer a Call

Digital signals, i.e. the received data DAT/RV separated from the above-mentioned demodulated signal, is decoded by decoder 137. Errors in the decoded signal are corrected by error correction circuit 136. The corrected signal is checked via I/O control circuit 134 by CPU 135 to determined whether the received data corresponds to its own telephone number. If it is its own number, CPU 135 instructs data generation circuit 138 to generate transmitting data DAT/TX necessary for connecting to a channel instructed by the base station. Thus, the transmitting data is responded to with an acknowledge signal to the base station so as to establish the channel connection.

(b) Control to Place a Call

In placing a call, the opposite party's telephone number dialed into keyboard 132 is processed by sub CPU 133, and is input via I/O control circuit 134 (whose function is described later to main CPU 135, which then instructs, via I/O control circuit 134, data generator 138 to match its own telephone number with the opposite party's control signal, such as identification numbers, etc., so as to generate transmitting data DAT/TX. Transmitting data DAT/TX input to summing circuit 108 as described above is transmitted out to the base station.

(c) Control to Register the Position

Zone information indicating the current zone is constantly transmitted from each base station; therefore the mobile station, i.e. portable telephone set, compares the received information with the zone information of the home zone where the portable telephone is registered so as to recognize whether the mobile station is currently located in the home zone. On moving into an adjacent zone, the portable telephone, which receives the adjacent zone's information which is different from that of the home zone, transmits to the base station its own telephone number, which is then confirmed by an acknowledge signal from the base station, so as to renew its own number registration thereto.

(d) Control to Switch the Zone While Talking

When a base station, which is constantly watching the electric field intensity of the signals sent from each mobile station, detects a decrease in the electric field intensity of the mobile station, the base station sends the detected results to the central control station which controls all the base stations in its control zone. The control station then requests all the base stations in the control zone to watch their receiving signal levels, so as to find and switch to the zone which the mobile station is to move into, according to the watched data.

(e) Control to End a Call

The speech channel connected with the base station is disconnected when the talk is finished.

(f) Other Controls

A display 131 displays the calling number or the status of the telephone, such as a busy state. I/O controller 134 carries out an interface between sub-CPU 133, data correction circuit 136 and data generation circuit 138.

For the communication between the base station and the mobile station for the above-described controls, only the necessary data are read out of the data written in RAM 140, and are sent out in a predetermined format, as typically shown in FIG. 11, to the base station.

Figure 12A:
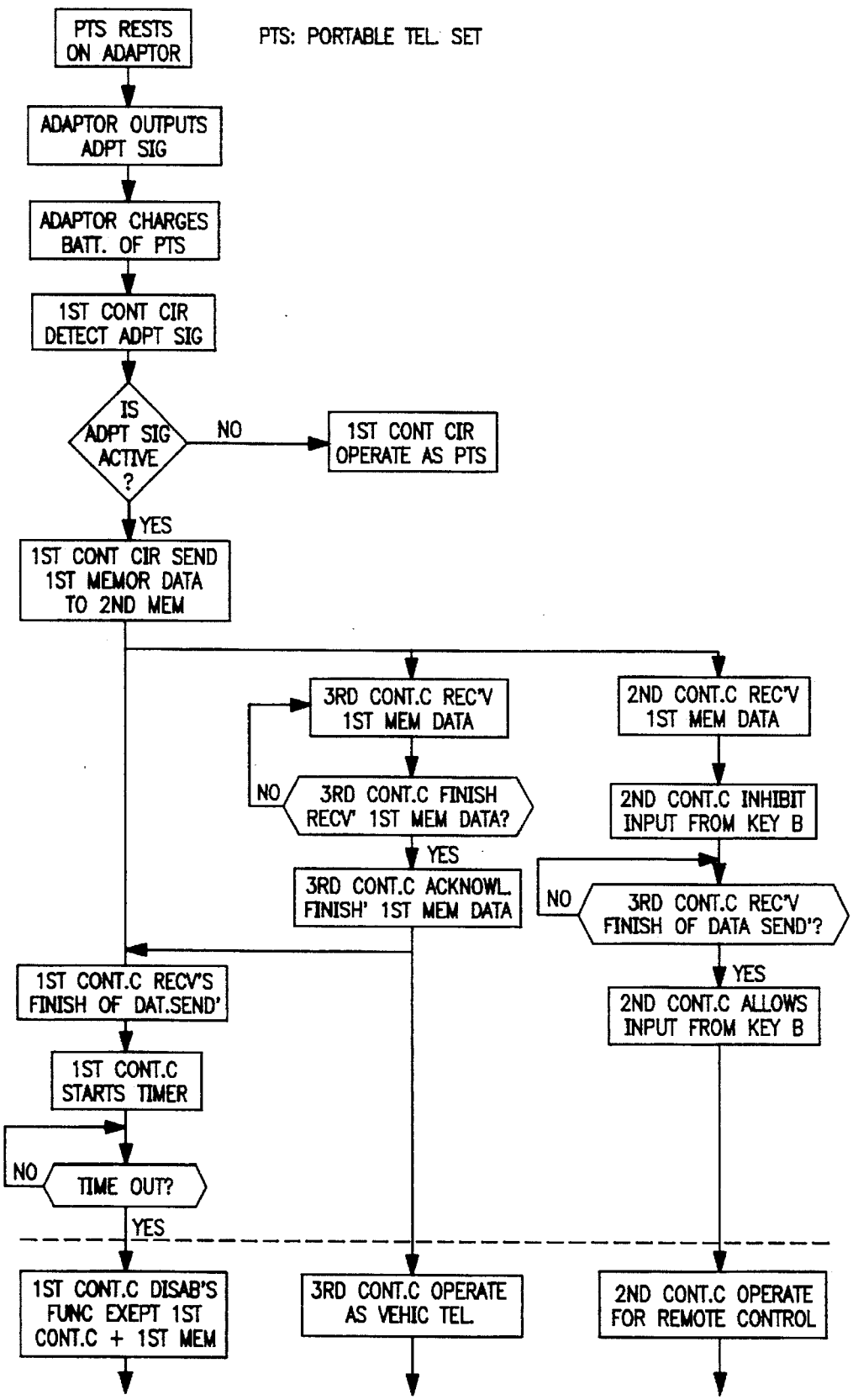
FIGS. 12(a) and 12(b) form a flow chart of the function of the first preferred embodiment.
Figure 12B:
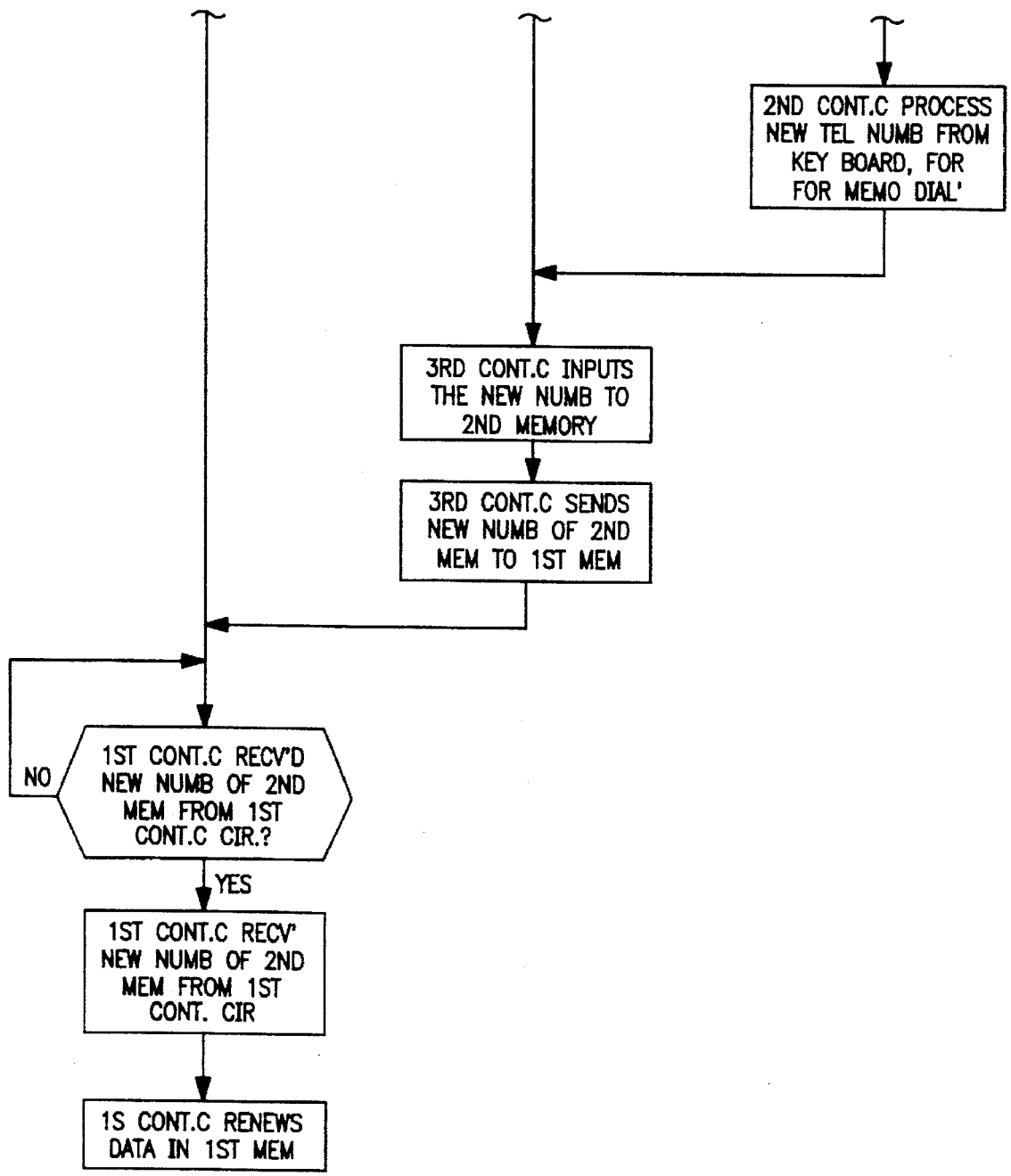

Operation of the portable telephone set 21 installed on adaptor 22 in a vehicle is hereinafter described. When portable telephone set 21 is rested on adaptor 22, a micro switch 304 (FIG. 8) detecting the existence of portable telephone set 21 is closed to supply a power source voltage so that adaptor 22 transmits an adaptor signal ADPT to portable telephone set 21. On receiving the adaptor signal ADPT, first control circuit 32 transfers the data, such as the identification numbers, etc., stored in RAM 140 (in first memory 33), via adaptor 22 to the second RAM 240 in transceiver unit 23, as an up-link data DAT/UP. After waiting a period, for example 10 s preset in timer 152 after completion of the data transfer, the supply of power source voltage to, for example, the transmitter circuit of portable telephone set 21 is discontinued so as to disable the function as a portable telephone set 21. The data transfer and the power supply discontinuation are instructed by CPU 135 in first control circuit 32 according to the program in ROM 139. Function-ceasing circuit 31 shown in FIG. 4, i.e. timer 152 shown in FIG. 6, is composed of this operation of CPU 135 according to the program. A flow chart for these operations is shown in FIGS. 12(a) and 12(b). Operation of the charging circuit is described later in detail in the description of adaptor 22. If a new telephone number is input for a memory call via control unit 22 to the second RAM 240 (FIG. 9), this number is also input to first RAM 140 by CPU 235 and CPU 135, so that the newly input telephone number can be used for a memory call from portable telephone set 21 even after portable telephone set 21 is taken out of the vehicle.

Circuit configuration of transceiver unit 23 shown in FIG. 9 is basically identical to that of portable telephone set 21 shown in FIG. 6, except that the transmitting power is 3 W, and there is no handset, keyboard, display, earphone, microphone, charging circuit and battery. The way of using the RAMs which store the identification numbers, etc. is also different. Therefore, the corresponding circuits are denoted with the numerals having the same last-two digits.

Operation of transceiver unit 23 is hereinafter described:

(1) Transmitter circuit and transmitting-audio circuit.

Transmitting-audio signal AUD/TX output from handset 28 of control unit 24 goes via adaptor 22 to microphone amplifier 202, bandpass filter (BPF) 203, and compressor 204 where the dynamic range is compressed to 2:1, and further goes to pre-emphasis circuit 205, instantaneous frequency deviation limiting circuit 206 and splatter filter 207, so as to compress its harmonic components and to limit the bandwidth. Output from splatter filter 207 is added with transmitting data DAT/TX, including the above-described identification numbers, by summing circuit 208. The added signal is input, as a modulation signal, to transmitter synthesizer with modulator 209, which then outputs an FM signal. The FM signal is output, via BPF 210, power amplifier 212 and duplexer 213a, to vehicular antenna VHC ANT, so as to transmit, for example, 3 watt radio frequency power.

(2) Receiver circuit and received-audio circuit.

Received radio frequency signal goes to duplexer 213b and pre-amplifier 233, and is input via BPF 229 to mixer 299, to which the output of receiver synthesizer 232 is also input. Frequencies of thus input signals are converted therein to output an FM IF signal. This FM IF signal passing through BPF 228 is amplified by IF amplifier 227. The amplified signal is discriminated by FM discriminator 226, an output of which is separated into a analog signal and a digital signal. The analog signal is sent via de-emphasis circuit 225, BPF 224 and expander 223 to audio amplifier 222, from which received-audio signal AUD/RV is output so as to input to earphone 186 of handset 28 of control unit 24.

(3) Control Circuit

Digital signal, i.e. received data signal DAT/RV, output from frequency discriminator 226 is input to data decoder 237 and then to error corrector 236, from which corrected data is output. Main CPU 235 checks the data via I/O controller 234 whether the data is of the own telephone number stored in RAM 240. If it is true, CPU 235 executes the procedure necessary for the mobile telephone in response to the control of the base station in the same way as that described for the portable telephone. In placing a call, CPU 235 executes the procedure necessary for placing a call according to an up-link data DAT/UP (which is described later) dialed in control unit 24, and the data transferred from portable telephone set 21 and now stored in RAM 240. Description about ROM 239 is given later.

(4) Power Supply Circuit

When a power supply switch 188 (see FIG. 7) in control unit 24 is manually activated and the ignition sense line is also activated by an ignition switch or an accessory switch of the vehicle, power switch 250 (FIG. 9) in transceiver unit 23 is activated so as to deliver the power supply voltage from a vehicle battery (shown in FIG. 10) to the circuits in transceiver unit 23 and to control unit 24 via adaptor 22.

In adaptor 22 whose circuit configuration is shown in FIG. 8, charge control switch 304 is formed of a micro switch, which is actuated by a portable telephone set 21 resting on adaptor 22 so as to become conductive. Driven by the output of charge control switch 304 and an ignition sense line, power switch control circuit 302 enables power switch 301 to deliver the vehicle battery voltage via charging circuit 303 to battery 151 in portable telephone set 21, so that battery 151 is charged. Charging circuit 303 determines the charging current and detects completion of the charge.

Thus, control unit 24, adaptor 22 and transceiver unit 23 together can also function as an independent vehicle telephone having no portable telephone set adapted thereto as well as an adaptor system for a portable telephone set. Therefore, identification numbers, etc. registered to this independent vehicle telephone may be written in ROM 239 in advance. Then, according to the data loaded in RAM 240 from ROM 239 the operations to place/answer a call are executed in the same way as the above-described preferred embodiment. Moreover, for the case where portable telephone set 21 is adaptable to the vehicle telephone, CPU 235 may be programmed in advance so that the vehicle telephone can place/answer a call according to the multiple phone numbers stored in RAM 240, i.e. of the vehicle telephone and portable telephone. Then, the owner of the portable telephone will never miss a call for either phone number while he is in the vehicle.

Control unit 24 may further have a speaker unit 29 and a hands-free microphone 30, for allowing hands-free talking without picking up handset 28.

Figure 1:
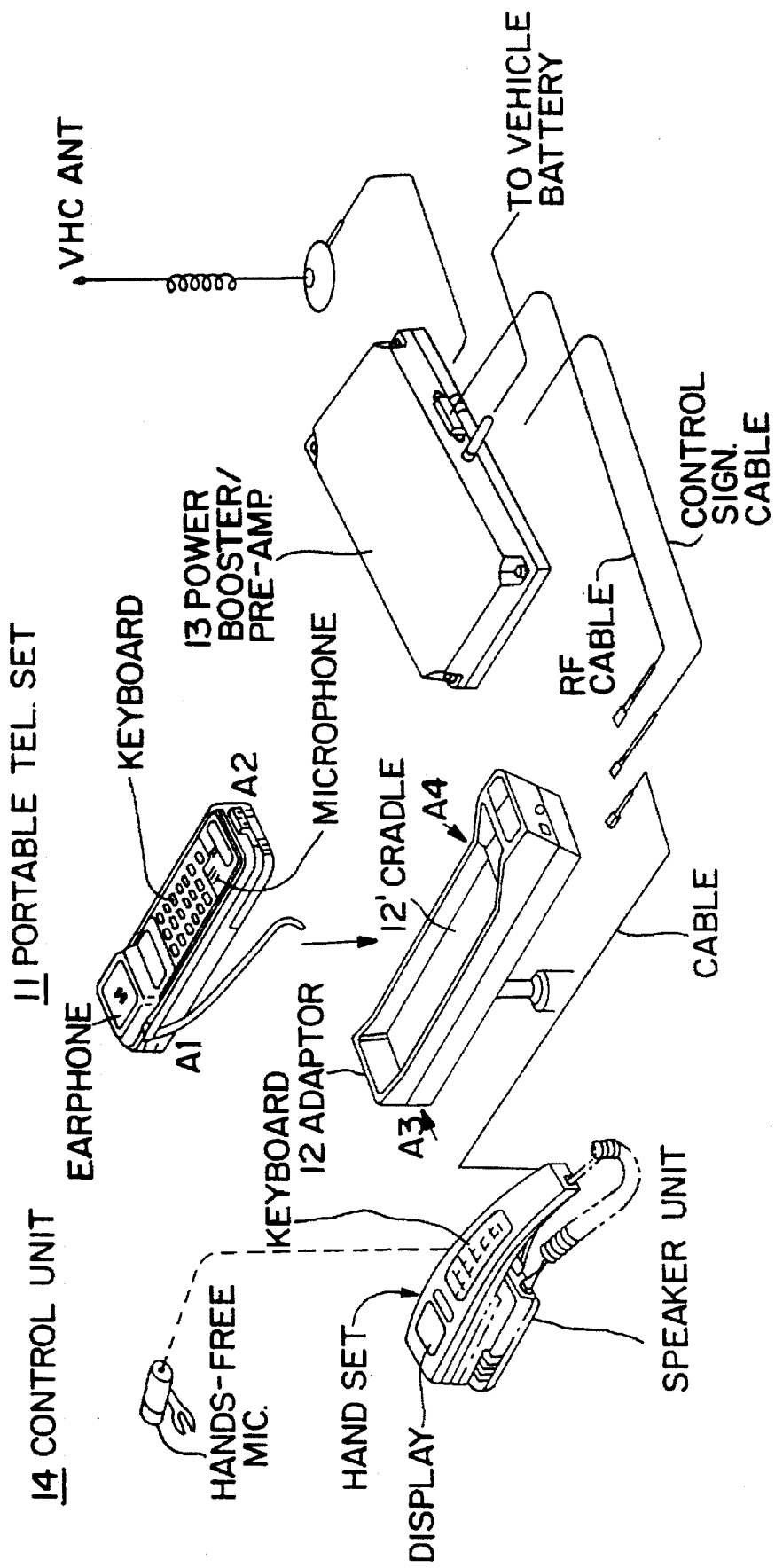
FIG. 1 is a schematic diagram of a prior art system configuration adapting a portable telephone set.

The system configurations according to the above-described preferred embodiments are advantageous in the following effects:

(1) The vehicle telephone system according to the above preferred embodiments can be available at a lower cost than the FIG. 1 power booster/pre-amplifier system which must be produced in relatively small quantities, because transceiver 23 is produced in a very large quantity for the popular vehicle telephone systems, even though more complex circuitry is employed therein than in prior art power booster/pre-amplifier 13.

(2) The function to transferring the identification numbers is additionally required by the portable telephone set; however, this additional function can be done by a simple addition of the program, causing no increase in the production cost.

(3) The control unit and the hand set, which are also produced in a vary large quantity for vehicle telephones, can be inexpensive as well as excellent in their handling in the vehicle.

(4) Adaptor 2 is simpler and smaller, and accordingly less expensive, than that of the prior art which requires a radio frequency coupler.

(5) Only a small investment in an expensive adaptor 22 allows one who already has a vehicle telephone to use a portable telephone in the vehicle.

(6) One who already has a portable telephone can also purchase a vehicle telephone at a cost equal to or less than the cost for purchasing the FIG. 1 prior art system which is considerably expensive.

Figure 13:
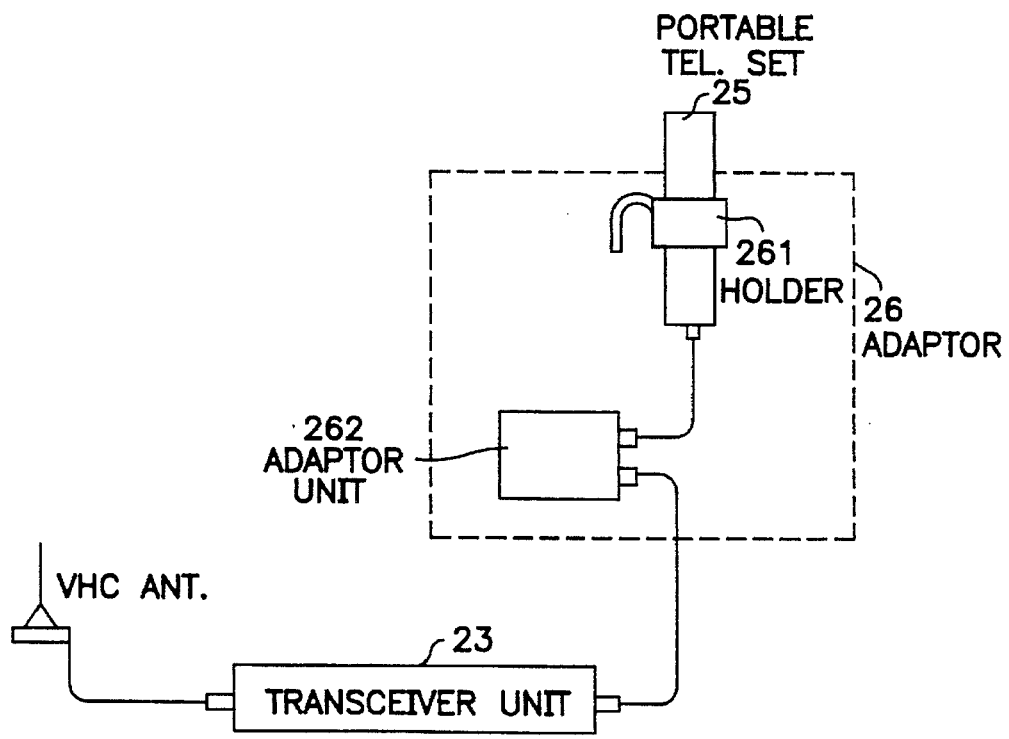
FIG. 13 is a schematic diagram of a configuration of the second preferred embodiment of the present invention.
Figure 14:
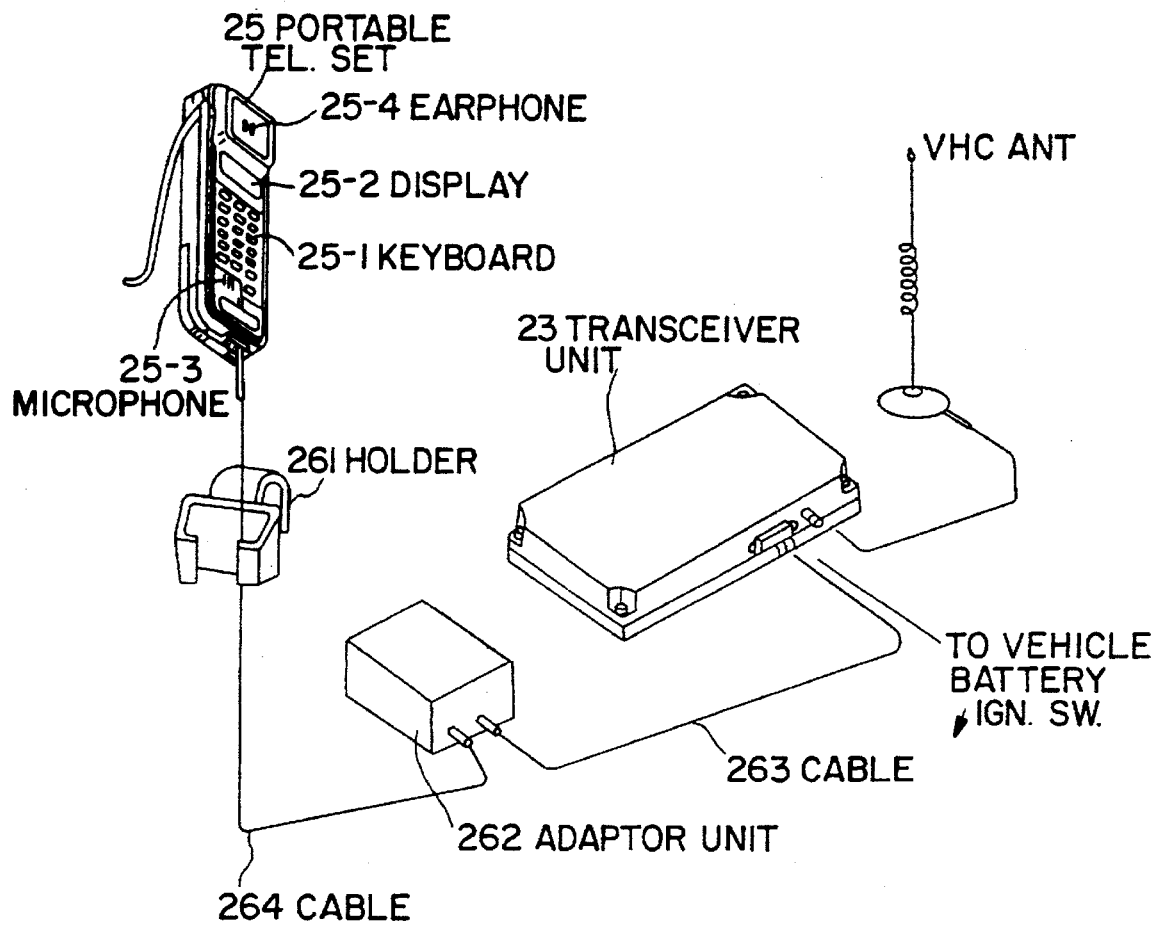
FIG. 14 is a schematic diagram of a perspective view of a second preferred embodiment of the present invention.
Figure 15:
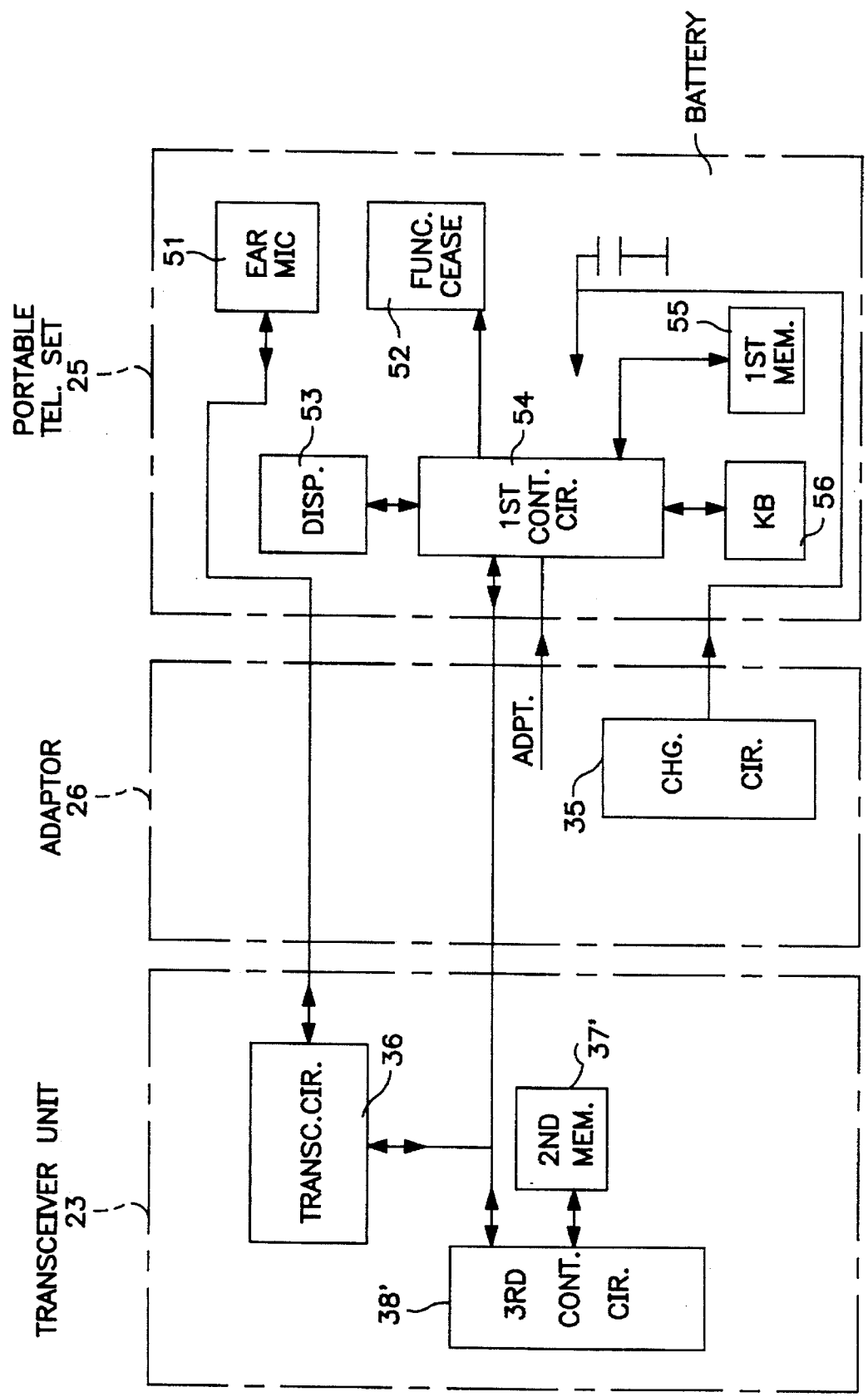
FIG. 15 is a principle block diagram of the second preferred embodiment of the present invention.
Figure 16:
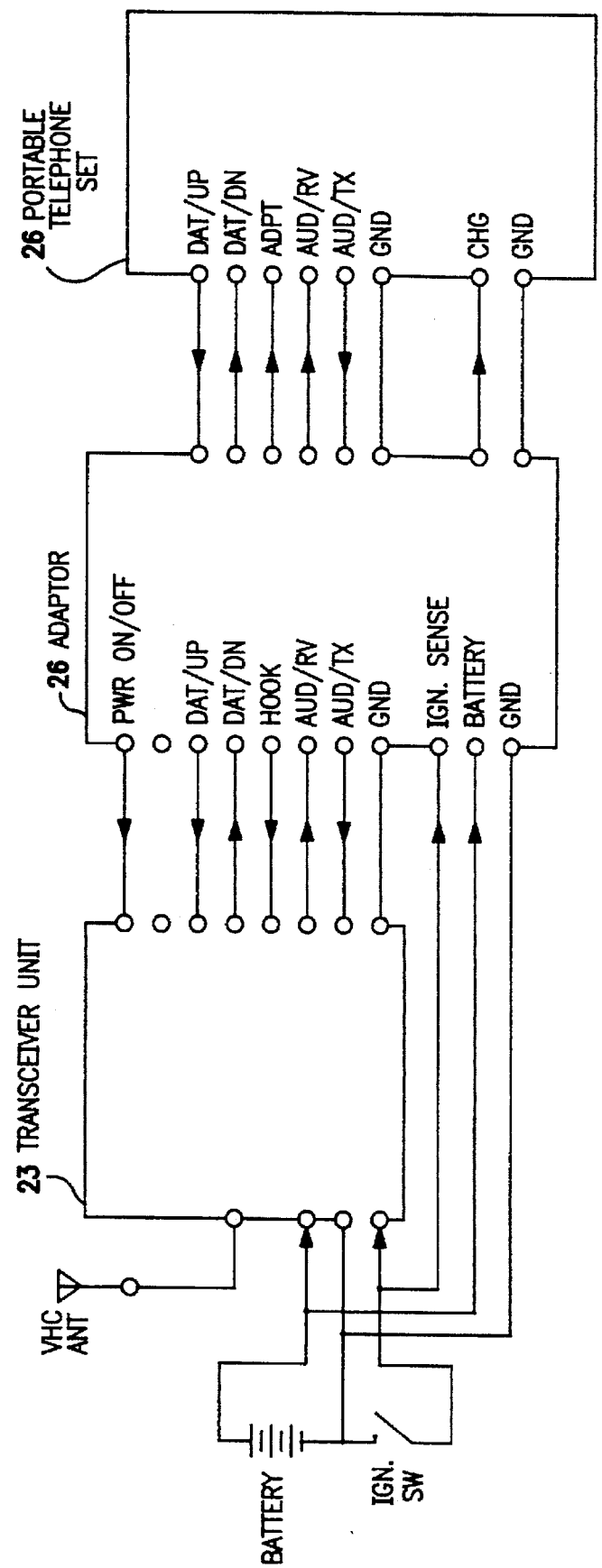
FIG. 16 is a diagram of the interconnection of FIG. 15 in accordance with the second preferred embodiment.
Figure 17:
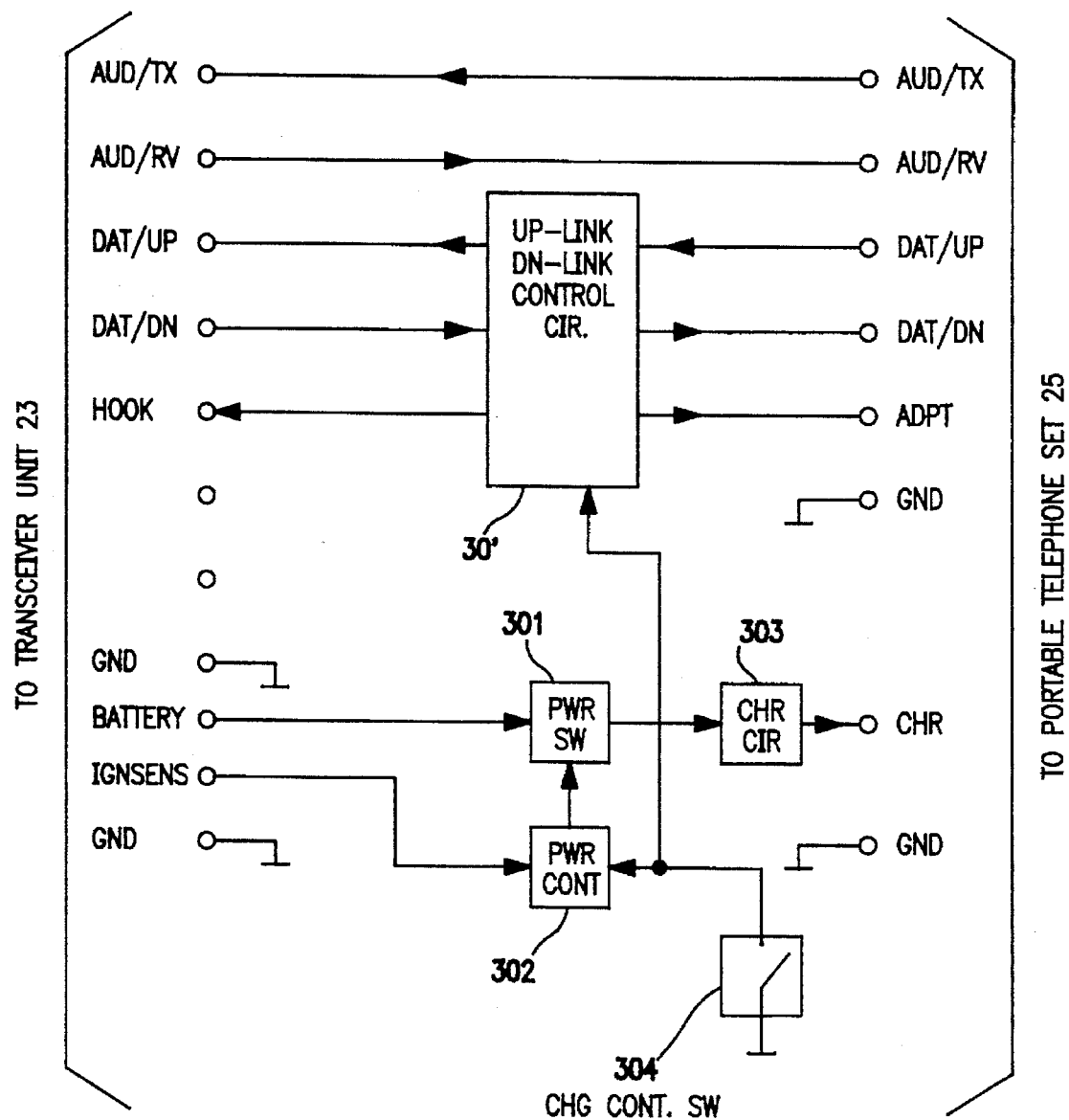
FIG. 17 is a circuit block diagram of an adaptor in accordance with the second preferred embodiment.
Figure 18A:
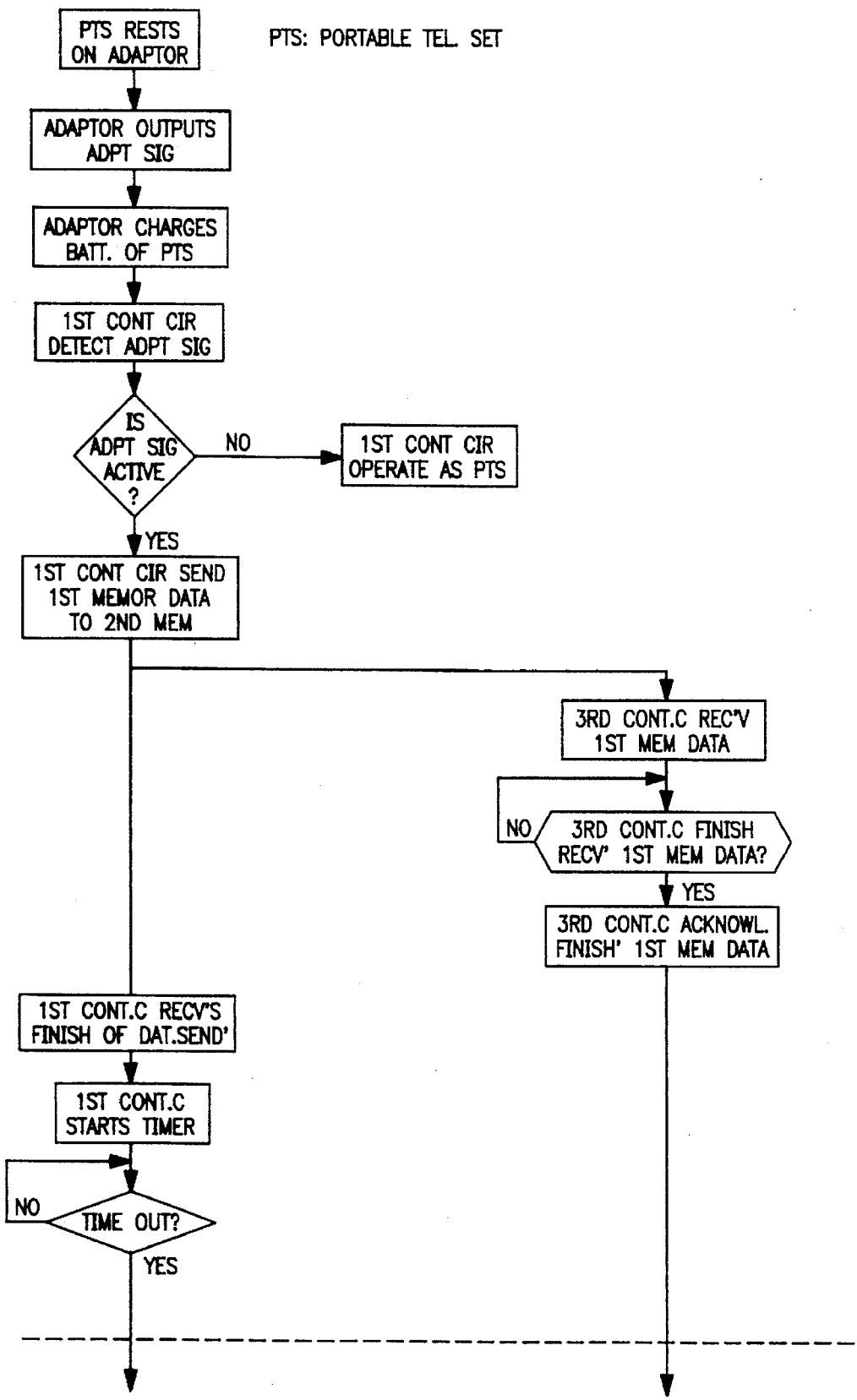
FIGS. 18(a) and 18(b) a flow chart for the operation of the second preferred embodiment.
Figure 18B:
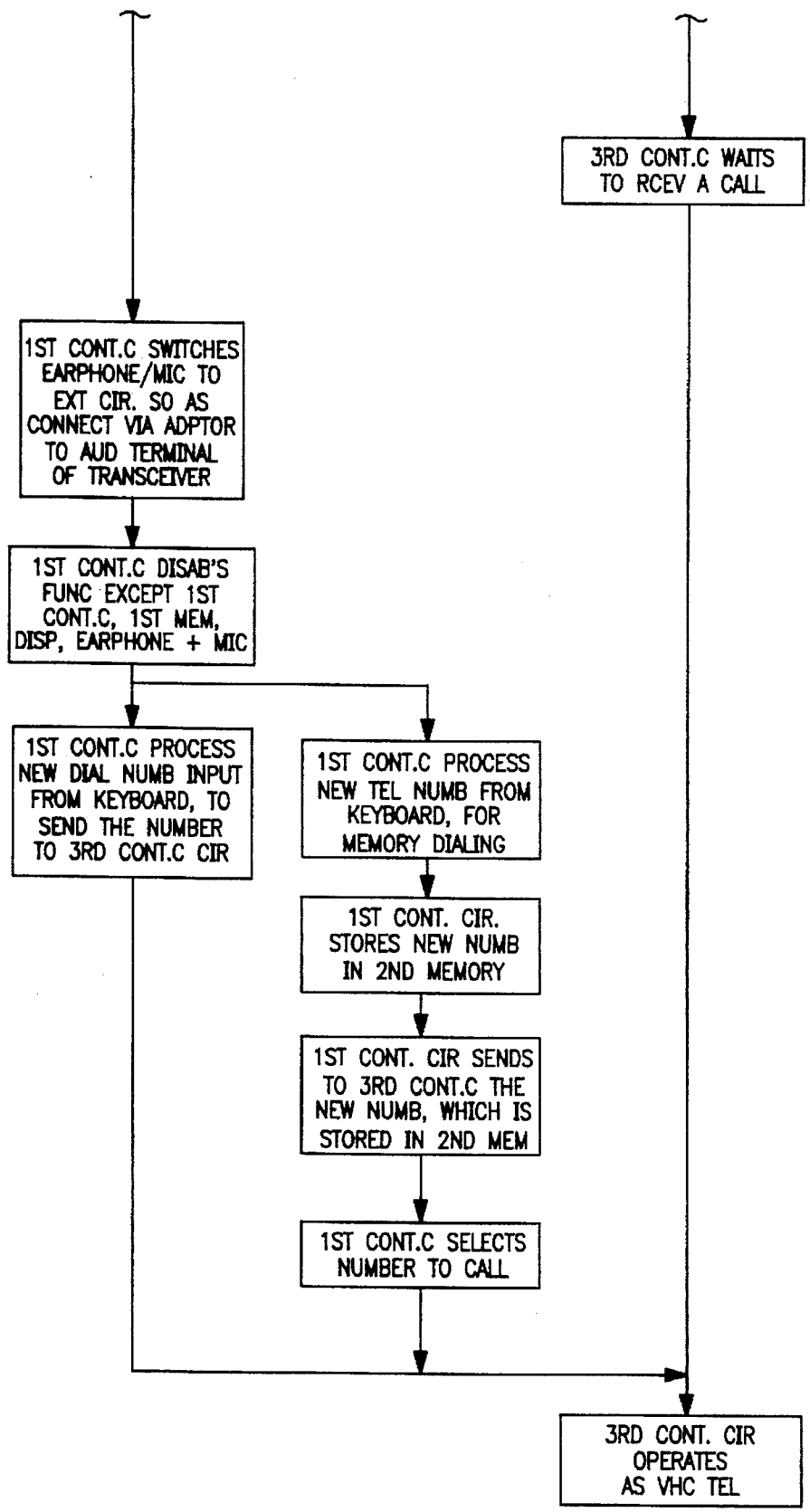

A second preferred embodiment of the present invention is hereinafter described with reference to a schematic configuration of FIG. 13, a perspective view of FIG. 14 and a principle block diagram of FIG. 15. In the second preferred embodiment, the key board 25-1, display 25-2, microphone 25-3 and earphone 25-4, of portable telephone set 25 are utilized in place of control unit 24 of the first preferred embodiment. An adaptor 26 is formed of an adaptor unit 262 and a holder 261 (see FIG. 13) hung typically on a wall or dash board of the vehicle so as to mechanically hang portable telephone set 25 as shown in FIG. 14, where portable telephone set 25 is now picked up from holder 261. Adaptor unit 262 relays electrical connections between portable telephone set 25 and transceiver unit 23, by means of cables 263 and 264, each having a plurality of wirings. That is, instead of exposed contacts 25-1 of the first preferred embodiment, the electrical connections between portable telephone set 25 and adaptor unit 262 are carried out by cable 264, an end of which has a modular jack to be detachable inserted into a socket (not seen in FIG. 14) provided at the bottom end of portable telephone set 25. Circuit configuration of portable telephone set 25 is shown in FIG. 6 where the * marked portions, which are not used in the first preferred embodiment, are used now. When the modular jack is inserted to the socket, an adaptor signal ADPT carried by one of the wirings of cable 264 is input to I/O control circuit 134 of portable telephone set 25, whereby the identification numbers, and other information stored in RAM 140, are transferred via adaptor unit 262 to RAM 240 of transceiver unit 23 in the same way as in the first preferred embodiment. After waiting a period predetermined by timer 15 (152) power supply voltage to, for example, the transmitting circuit of portable telephone set 25 is disabled; furthermore, switches 201 and 221 disconnect microphone 101 and its amplifier 102 and earphone 121 and its amplifier 220 from respective amplifiers 103 and 122, so as to connector to the wirings of cable 264, each denoted with AUD/TX and AUD/RV in FIG. 6. On and after these operations, the power voltage supply is kept on to charge battery 151 in the same way as the first preferred embodiment. The internal circuit of adaptor unit 262 is shown in FIG. 17, where charging circuit 35 and the related circuits are identical to those of the first preferred embodiment. Up-link/down-link control circuit 30' controls connections of signals between portable telephone set 25 and transceiver unit 23. In placing/answering a call, portable telephone set 25 is picked up from holder 261 so as to be used as control unit 24 of the first preferred embodiment. That is, the telephone number to call is input to key board 25-1 of portable telephone set 25. The input number is processed by sub CPU 133 (see FIG. 6), and then input via I/O control circuit 134 and data generator circuit 138 to transceiver unit 34, where the procedure for placing the call may be carried out according to the memory-dial numbers and the identification data stored in RAM 240 of transceiver unit 23. These operations initiated by adaptor signal are executed by the first control circuit 32 according to a program installed in ROM 139 in advance in the same way as the first preferred embodiment. Voice talk is carried out with microphone 101 and earphone 121 (FIG. 6), both of portable telephone set 25, whose voice signals are sent/received via adaptor unit 262 to/from transceiver unit 23. After portable telephone set 25 is picked up from holder 261, a hook key of the keyboard is pushed so as to transmit a hook signal HOOK via adaptor unit 262 to transceiver unit 23, or a micro switch (not shown in figures) may be provided on holder 261 so as to detect the existence of portable telephone set held in holder 261 and generate the hook signal HOOK when portable telephone set 25 is removed from holder 261. Cable 264 may be detachable connected to adaptor unit 262 by means of plug and socket (not shown in the figures), where the plug may actuate a micro switch (not seen in the figure) provided in adaptor 262 so as to generate adaptor signal ADPT. The circuit configuration and operation of transceiver unit 23 are identical to those of the first preferred embodiment, as shown in FIG. 9. The flow chart of the above-described operation is shown in FIGS. 18(a) and 18(b).

The system configuration according to the above second preferred embodiment is advantageous for the reasons set forth in items (1), (2) and (4) with respect to the above-described first preferred embodiment. As for effect (3), the portable telephone set being used as a handset and held in the holder when not in use, is advantageous in its easy handling in the vehicle. As a result of all of the above, due to the employment of inexpensive additional components, there is achieved a system superior to the FIG. 1 prior art system in cost, compactness and system expandability.

Though in the above first preferred embodiment the electrical connections between the portable telephone set and the vehicular adaptor are accomplished by the automatic contact between contacts respectively provided exposingly upon a side of each body when the portable telephone set is placed on the adaptor, it is apparent that his contact connection may be replaced with a detachable connection performed by the cable, jack and socket as described in the second preferred embodiment.

Though in the above preferred embodiments, on receiving the adaptor signal, the portable telephone set disables the transmitting circuit, the purpose of this operation is to disable the portable telephone set so as to be a device for placing a call; therefore, one or some of the circuits, such as the transmitter circuit; the receiver circuit, the first control circuit and the audio frequency circuit, may be disabled in order to achieve the purpose. The circuit(s) to be disabled is determined depending on an optional function which is not described in the description of the above preferred embodiments. Therefore, a long as any means to protect the portable telephone set from unexpected erroneous operation is satisfactorily provided, it is not always necessary to disable the circuit(s).

Though in the above description of the second preferred embodiment, switches 201 and 221 are provided in portable telephone set 25, these switches are not always necessary, i.e. amplifiers 102 and 220 may be always connected respectively to BPF 103 and amplifier 122 and corresponding one of cables 263, as long as the voice routes via BPF 103 and via amplifier 122 can be disabled, so that the voices from/to microphone 101/earphone 121 do not disturb or are not disturbed by these routes. In other words, the switches may be omitted if the power source voltage supply to audio circuits in the transmitting circuit and the receiving circuit can be disabled.

Though the above descriptions for the preferred embodiments are given for the case where the power switch of the portable telephone set has been already conductive when the portable telephone set is connected to the adaptor, if the power switch is then non-conductive, the adaptor signal ADPT actuates the power switch to be conductive and then initiates the transfer of the identification numbers to the transceiver unit.

Though in the description of the preferred embodiments the identification numbers are transferred from the RAM in the portable telephone set because a RAM is faster than a ROM, it is apparent that the identification numbers may be transferred from the ROM of the portable telephone set.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not desired to limit the invention and accordingly, all suitable modifications and equivalents may be resorted to, falling within the scope of the invention.

What I claim is:

1. A mobile telephone system comprising:
    a portable telephone set capable of operating outside a vehicle, including:
        a keyboard;
        a microphone;
        an earphone;
        a battery;
        a first memory for storing identification numbers registered to said portable telephone set;
        a first transceiver circuit including a transmitter circuit and a receiver circuit, said first transceiver circuit receiving and transmitting a radio frequency wave carrying voice signals and the identification numbers;
        a first control circuit, coupled to said first memory, for controlling placing/answering of a call according to the identification numbers stored in said first memory; and
        a first electrical connection means;
    a transceiver unit, including:
        a second transceiver circuit for outputting a radio frequency signal carrying a voice signal and the identification numbers of said portable telephone set when the identification numbers are transferred to said second transceiver circuit;
        a second memory for storing the identification numbers;
        a second control circuit, coupled to said second memory and said second transceiver circuit, for transferring the identification numbers to said second transceiver circuit and for controlling placing/answering of a call according to the identification numbers sorted in said second memory; and
    adaptor means, comprising:
        second electrical connection means for connecting to said first electrical connection means, and for outputting an adaptor signal, said first control circuit transferring the identification numbers stored in said first memory to said second memory on receiving the adaptor signal; and
        wirings to connect to said transceiver unit,
    said portable telephone set further including means for disabling a power supply to said first control circuit after the identification numbers stored in said first memory are transferred to said second memory.

2. A mobile telephone system as recited in claim 1, wherein said adaptor means further comprises a circuit for supplying a voltage to said portable telephone set so as to charge said battery.

3. A mobile telephone system as recited in claim 1, wherein said first electrical connection means is formed of socket means.

4. A mobile telephone system as recited in claim 3, wherein said adaptor means comprises cables and a jack provided on an end thereof to be detachable connected to said socket means.

5. A mobile telephone system as recited in claim 1, wherein said adaptor means further comprises means for supporting said portable telephone set.

6. A mobile telephone system comprising:
    a portable telephone set capable of operating outside a vehicle, and portable telephone set including:
        a first memory for storing identification numbers corresponding to said portable telephone set; and
        a first control circuit, coupled to said first memory, for controlling placing/answering of a call according to the identification numbers;
    a transceiver unit, including:
        a transceiver circuit for outputting a radio frequency signal carrying a voice signal and the identification numbers;
        a second memory; and
        a second control circuit, coupled to said second memory and said transceiver circuit, for controlling placing/answering of a call;
    an adaptor for electrically connecting said portable telephone set to said transceiver unit, and for outputting an adaptor signal which caused the first control circuit to transfer the identification numbers stored in said first memory to said second memory,
    said portable telephone set further including means for disabling power supply to said first control circuit after the identification numbers stored in said first memory are transferred to said second memory.

7. A mobile telephone system comprising:
    a portable telephone set capable of operating outside a vehicle, including:
        a keyboard;
        a microphone;
        an earphone;
        a battery;

a first memory for storing identification numbers registered to said portable telephone set;

a first transceiver circuit including a transmitter circuit and a receiver circuit, said first transceiver circuit receiving and transmitting a radio frequency wave carrying voice signals and the identification numbers;

a first control circuit, coupled to said first memory, for controlling placing/answering of a call according to the identification numbers stored in said first memory; and first electrical connection means;

a transceiver unit including:

a second transceiver circuit for outputting a radio frequency signal carrying a voice signal and the identification numbers of said portable telephone set when the identification numbers are transferred to said second transceiver circuit;

a second memory for storing the identification numbers; and a second control circuit, coupled to said second memory and said second transceiver circuit, for transferring the identification numbers to said second transceiver circuit and for controlling the placing/answering of a call according to the identification numbers stored in said second memory, said portable telephone set further including means for disabling a power supply to said first control circuit after the identification numbers stored in said first memory are transferred to said second memory.

8. A mobile telephone system comprising:

a portable telephone set capable of operating outside a vehicle, said portable telephone set including:

a first memory for storing identification numbers corresponding to said portable telephone set; and a first control circuit, coupled to said first memory, for controlling placing/answering of a call according to the identification numbers;

a transceiver unit including:

a transmitter circuit for outputting a radio frequency wave carrying a voice signal and the identification numbers;

a second memory; and a second control circuit, coupled to said second memory and said transmitter circuit, for controlling placing/answering of a call;

said portable telephone set further including means for disabling a power supply to said first control circuit after the identification numbers stored in said first memory are transferred to said second memory.

* * * * *

UNITED STATES PATENT AND TRADEMARK OFFICE
CERTIFICATE OF CORRECTION

PATENT NO. : 5,659,594
DATED : Aug. 19, 1997
INVENTOR(S) : TODA

It is certified that error appears in the above-identified patent and that said Letters Patent is hereby corrected as shown below:

TITLE PAGE: [56] References Cited: Under U.S. Patent Documents, the third reference, change "Bordon et al." to --Bardon et al.--.

Col. 3, line 61, after "18(b)" insert --form--.

Figure 7:
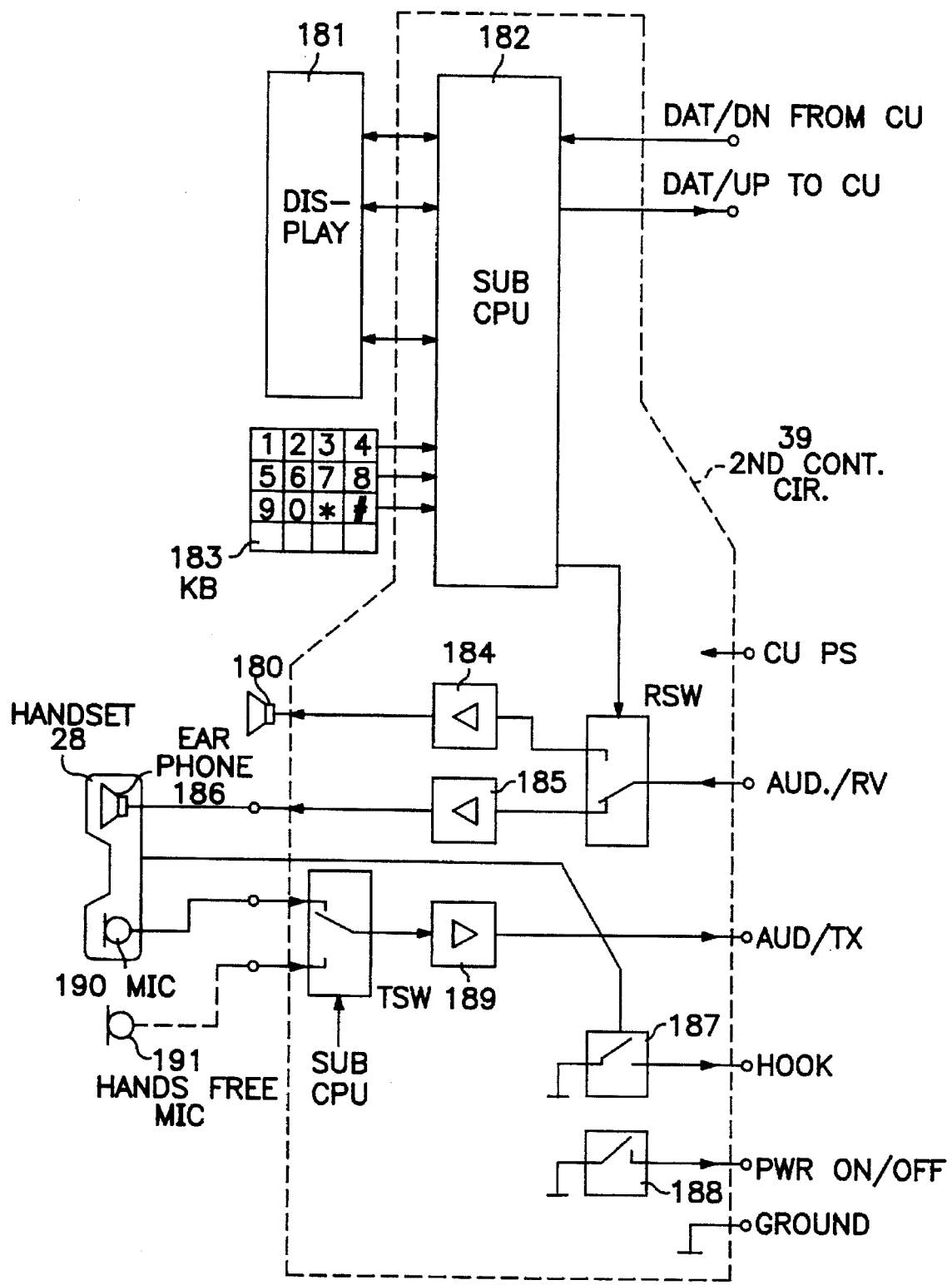
FIG. 7 is a circuit block diagram of a control unit.

Col. 4, line 60, after "control" insert --unit 24 is shown in FIG. 7, where the second control--.

Col. 10, line 1, change "connector" to --connect--.

Col. 12, line 30 (Claim 4, line 3), change "detachable" to --detachably--.

Signed and Sealed this

Third Day of February, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.    : 5,659,594
DATED         : August 19, 1997
INVENTOR(S)   : TODA

It is certified that error appears in the above-identified patent and that said Letters Patent is hereby corrected as shown below:

Column 9
    Line 24, change "expensive" to --inexpensive--.

Signed and Sealed this

Twenty-fourth Day of March, 1998

Attest:

BRUCE LEHMAN

*Attesting Officer*       *Commissioner of Patents and Trademarks*